US012586859B2

(12) United States Patent
Chi et al.

(10) Patent No.: US 12,586,859 B2
(45) Date of Patent: Mar. 24, 2026

(54) BATTERY MODULE AND METHOD OF MANUFACTURING THE SAME

(71) Applicant: LG Energy Solution, Ltd., Seoul (KR)

(72) Inventors: Ho June Chi, Daejeon (KR); Jeong Oh Moon, Daejeon (KR); Kyung Mo Kim, Daejeon (KR); Heejun Jin, Daejeon (KR); Jin Yong Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 994 days.

(21) Appl. No.: 17/436,240

(22) PCT Filed: Mar. 23, 2020

(86) PCT No.: PCT/KR2020/003927
§ 371 (c)(1),
(2) Date: Sep. 3, 2021

(87) PCT Pub. No.: WO2020/197208
PCT Pub. Date: Oct. 1, 2020

(65) Prior Publication Data
US 2022/0131229 A1 Apr. 28, 2022

(30) Foreign Application Priority Data

Mar. 26, 2019 (KR) ........................ 10-2019-0034618

(51) Int. Cl.
*H01M 50/296* (2021.01)
*H01M 50/224* (2021.01)
(Continued)

(52) U.S. Cl.
CPC ....... *H01M 50/296* (2021.01); *H01M 50/224* (2021.01); *H01M 50/227* (2021.01);
(Continued)

(58) Field of Classification Search
CPC ...... B60K 1/04; B60K 6/28; B60K 2001/005; B60L 50/64; B60L 50/66;
(Continued)

(56) References Cited

U.S. PATENT DOCUMENTS 7,875,378 B2 1/2011 Yang et al.
7,892,669 B2 2/2011 Yang et al.
(Continued)

FOREIGN PATENT DOCUMENTS

CN 103931018 A 7/2014
CN 108463902 A 8/2018
(Continued)

OTHER PUBLICATIONS

WO2013108118A1, Brisendal, et al. "Improved cell cassette with inbuilt cell tab stress relieving structure", retrieved from https://worldwide.espacenet.com/ Date: Oct. 28, 2024 (Year: 2013).*
(Continued)

*Primary Examiner* — Tiffany Legette
*Assistant Examiner* — Jared Hansen
(74) *Attorney, Agent, or Firm* — Lerner David LLP

(57) ABSTRACT

A battery module includes: a battery cell assembly including a plurality of battery cells adjacent to each other and stacked in parallel and a plurality of electrode leads protruded from respective ones of the plurality of battery cells; and a module cover accommodating the battery cell assembly, wherein the module cover includes an upper cover part exposing the plurality of electrode leads while covering an upper surface and a side surface of the battery cell assembly and a bus bar frame part coupled with the upper cover part and integrally formed with the upper cover part at a position corresponding to the plurality of electrode leads exposed by the upper cover
(Continued)

part, and wherein the bus bar frame part includes a plurality of bus bars electrically connected to respective ones of the plurality of electrode leads.

19 Claims, 6 Drawing Sheets

(51) Int. Cl.

| | |
|---|---|
| *H01M 50/227* | (2021.01) |
| *H01M 50/50* | (2021.01) |
| *H01M 50/505* | (2021.01) |
| *H01M 50/562* | (2021.01) |
| *H01M 50/567* | (2021.01) |
| H01M 50/211 | (2021.01) |
| H01M 50/231 | (2021.01) |
| H01M 50/284 | (2021.01) |

(52) U.S. Cl.
CPC ......... *H01M 50/50* (2021.01); *H01M 50/505* (2021.01); *H01M 50/562* (2021.01); *H01M 50/567* (2021.01); *H01M 50/211* (2021.01); *H01M 50/231* (2021.01); *H01M 50/284* (2021.01); *H01M 2220/20* (2013.01)

(58) Field of Classification Search
CPC ......... B60L 2240/545; B60L 2240/547; B60L 2240/549; B60Y 2200/91; B60Y 2200/92; B60Y 2400/112; H01M 10/613; H01M 10/625; H01M 10/647; H01M 10/655; H01M 10/6556; H01M 50/20; H01M 50/24; H01M 50/204; H01M 50/293; H01M 50/502; H01M 50/507; H01M 50/519; H01M 50/533; H01M 50/543; H01M 50/557; H01M 2220/20; Y02E 60/10; Y02T 10/70
See application file for complete search history.

(56) References Cited

U.S. PATENT DOCUMENTS

| | | | |
|---|---|---|---|
| 8,968,901 B2 | 3/2015 | Yang et al. | |
| 9,269,934 B2 | 2/2016 | Yang et al. | |
| 9,337,455 B2 | 5/2016 | Yang et al. | |
| 9,484,591 B2 | 11/2016 | Shin et al. | |
| 9,620,826 B2 | 4/2017 | Yang et al. | |
| 9,969,296 B2 | 5/2018 | Kim et al. | |
| 2003/0096147 A1 | 5/2003 | Badding et al. | |
| 2006/0166053 A1 | 7/2006 | Badding et al. | |
| 2011/0070474 A1 | 3/2011 | Lee et al. | |
| 2014/0134462 A1 | 5/2014 | Choi et al. | |
| 2014/0141309 A1* | 5/2014 | Suzuki | H01M 50/231 429/99 |
| 2014/0248517 A1 | 9/2014 | Yoshioka | |
| 2015/0171493 A1 | 6/2015 | Freese et al. | |
| 2016/0248070 A1 | 8/2016 | Ahn | |
| 2016/0254505 A1* | 9/2016 | Eom | H01M 50/224 429/7 |
| 2017/0190264 A1 | 7/2017 | Kim et al. | |
| 2017/0278641 A1 | 9/2017 | Lee et al. | |
| 2018/0166660 A1 | 6/2018 | Kim et al. | |
| 2018/0194235 A1* | 7/2018 | Kim | B60L 50/50 |
| 2018/0331336 A1 | 11/2018 | Choi et al. | |
| 2019/0001838 A1* | 1/2019 | Choi | H01M 50/569 |
| 2019/0198952 A1* | 6/2019 | Choi | H01M 50/209 |
| 2019/0348720 A1 | 11/2019 | Oh et al. | |
| 2019/0389318 A1 | 12/2019 | Lee et al. | |
| 2020/0014005 A1* | 1/2020 | Lee | F16M 11/22 |
| 2020/0035980 A1 | 1/2020 | Hong et al. | |
| 2021/0057708 A1* | 2/2021 | Castillo | B60L 50/66 |
| 2021/0305546 A1* | 9/2021 | Chang | H01M 50/204 |
| 2022/0158308 A1 | 5/2022 | Chi et al. | |

FOREIGN PATENT DOCUMENTS

| | | | |
|---|---|---|---|
| CN | 113678314 A | 11/2021 | |
| EP | 3920267 A1 | 12/2021 | |
| JP | 2006244755 A | 9/2006 | |
| JP | 2013251241 A | 12/2013 | |
| JP | 2014527688 A | 10/2014 | |
| JP | 2015525442 A | 9/2015 | |
| JP | 2017532764 A | 11/2017 | |
| JP | 2018519623 A | 7/2018 | |
| JP | 2019012604 A | 1/2019 | |
| KR | 20070091387 A | 9/2007 | |
| KR | 20080110654 A | 12/2008 | |
| KR | 20100109871 A | 10/2010 | |
| KR | 20150050314 A | 5/2015 | |
| KR | 20170082041 A | 7/2017 | |
| KR | 20170103232 A * | 9/2017 | |
| KR | 20180005456 A | 1/2018 | |
| KR | 20180099438 A | 9/2018 | |
| KR | 20180135702 A | 12/2018 | |
| KR | 20190001409 A | 1/2019 | |
| KR | 20190078521 A | 7/2019 | |
| WO | WO-2013108118 A1 * | 7/2013 | H01M 10/0436 |
| WO | 2015065078 A1 | 5/2015 | |
| WO | 2018034382 A1 | 2/2018 | |
| WO | 2019004632 A1 | 1/2019 | |

OTHER PUBLICATIONS

KR20180135702A, Lee, et al. "Battery module with improved coupling structure between electrode lead and bus bar", machine English translation retrieved from https://worldwide.espacenet.com Date: Jan. 30, 2026 (Year: 2018).*
Extended European Search Report including Written Opinion for Application No. 20778609.6 dated Jun. 30, 2022, pp. 1-10.
Partial Supplementary European Search Report for European Patent Application No. 20778609.6 dated Mar. 18, 2022, 12 pgs.
International Search Report for PCT/KR2020/003927 dated Jun. 30, 2021. 3 pgs.
Search Report dated Jan. 12, 2023 from the Office Action for Chinese Application No. 202080024407.1 issued Jan. 18, 2023, 3 pages. [See p. 2, categorizing the cited references].

* cited by examiner

BATTERY MODULE AND METHOD OF MANUFACTURING THE SAME

CROSS-REFERENCE TO RELATED APPLICATION

This application is a national phase entry under 35 U.S.C. § 371 of International Application No. PCT/KR2020/003927, filed Mar. 23, 2020, published in Korean, which claims priority to and the benefit of Korean Patent Application No. 10-2019-0034618 filed in the Korean Intellectual Property Office on Mar. 26, 2019, the entire contents of which are incorporated herein by reference.

BACKGROUND OF THE INVENTION

(a) Field of the Invention

The present invention relates to a battery module and a manufacturing method thereof, and more specifically, relates to a battery module with improved assembly ease and a manufacturing method thereof.

(b) Description of the Related Art

Rechargeable batteries having high application characteristics and electrical characteristics such as high energy density according to their products are widely applied to battery powered vehicles, hybrid vehicles, and electric power storage devices driven by electric driving sources as well as portable devices. These rechargeable batteries are attracting attention as new energy sources for improving environmental friendliness and energy efficiency in that they do not generate any by-products of energy use, as well as their primary merit in which they can drastically reduce the use of fossil fuels.

A battery pack applied to an electric vehicle has a structure in which a plurality of cell assemblies including a plurality of unit cells are combined in series to obtain high power. Also, the unit cell may be repeatedly charged and discharged by an electrochemical reaction between constituent elements by including positive electrode and negative electrode current collectors, separators, active materials, and electrolyte solutions.

On the other hand, as the need for a large capacity structure has increased in recent years, as well as utilization as an energy storage source, a demand for the battery pack of a multi-module structure collecting a plurality of battery modules in which a plurality of rechargeable batteries are combined in series and/or in parallel is increasing.

When a plurality of battery cells are combined in series/in parallel to configure the battery pack, a method in which a battery module is first composed of at least one battery cell and other constituent elements are added using this at least one battery module to construct the battery pack is common. The number of battery modules included in the battery pack or the number of battery cells included in the battery module may be variously set according to a required output voltage or a charge and discharge capacity.

When manufacturing the battery module, the bus bar is connected to the electrode lead of the battery cell assembly, and in this process, the upper assembly on which the flexible printed circuit board for a sensing is formed and the bus bar frame with the bus bar are hinged to the bus, thereby the bar frame has a structure that is combined with the battery cell assembly by rotation. However, in this structure, there is a problem that the bus bar frame deviates and flows in the hinge part, or the flexible printed circuit board is damaged in the hinge part, and also, when the bus bar frame is rotated and combined with the electrode lead, there is a problem that it is difficult to align the electrode lead and the bus bar.

SUMMARY OF THE INVENTION

The present invention to solve such a problem is to provide a battery module and a manufacturing method thereof, which facilitates assembly between parts in a battery module and improves stability by simplifying a structure thereof.

However, the objective of the present invention is not limited to the aforementioned ones, and may be extended in various ways within the spirit and scope of the present invention.

A battery module according to an embodiment of the present invention includes: a battery cell assembly including a plurality of battery cells adjacent to each other and stacked in parallel, and a plurality of electrode leads protruded from respective ones of the plurality of battery cells; and a module cover accommodating the battery cell assembly, wherein the module cover includes an upper cover part exposing the plurality of electrode leads while covering an upper surface and a side surface of the battery cell assembly, and a bus bar frame part coupled with the upper cover part and integrally formed with the upper cover part at a position corresponding to the plurality of electrode leads exposed by the upper cover part, and wherein the bus bar frame part includes a plurality of bus bars electrically connected to respective ones of the plurality of electrode leads.

The bus bar frame part may include a plurality of slits in which respective ones of the plurality of electrode leads are inserted, and the plurality of bus bars may be disposed inside respective ones of the plurality of slits.

The plurality of slits may be opened toward a lower surface of the battery cell assembly exposed by the upper cover part.

The battery cell assembly may further include an insulating pad surrounded around the battery cell assembly and positioned between the battery cell assembly and the upper cover part.

The upper cover part may further include a cell housing tape disposed between the battery cell assemblies and the upper cover part.

The module cover may further include a lower plate covering a lower surface of the battery cell assembly exposed by the upper cover part.

The battery module may further include a heat dissipation pad disposed between the lower plate and the battery cell assembly.

Each one of the plurality of bus bars may include a clamping part to which an electrode lead of the plurality of electrode leads is inserted and a fixing part connecting and fixing the clamping part.

The bus bar frame part may be welded to the upper cover part.

A manufacturing method of a battery module according to an embodiment of the present invention includes: providing a battery cell assembly including a plurality of battery cells adjacent to each other and stacked in parallel and a plurality of electrode leads protruded from respective ones of the plurality of battery cells; preparing an upper cover part including a space accommodating the battery cell assembly by including an upper surface of the battery cell assembly and two side surfaces of the battery cell assembly perpendicular to the upper surface; disposing the upper cover part and two bus bar frame parts to cover end parts of the space and integrally combining the upper cover part and the two bus bar frame parts to manufacture a module cover; and accommodating the battery cell assembly in the space.

The two bus bar frame parts may include a plurality of slits each including an opening in which respective ones of the plurality of electrode leads are inserted, wherein the accommodating of the battery cell assembly in the space includes inserting the plurality of electrode leads in respective openings formed in the plurality of slits.

The two bus bar frame parts may include a plurality of bus bars disposed in respective ones of a plurality of slits and electrically connected to respective ones of the plurality of electrode leads.

The manufacturing method of the battery module may further include wrapping at least a portion of an outer surface of the battery cell assembly with an insulating pad before accommodating the battery cell assembly in the space.

The manufacturing method of the battery module may further include attaching a cell housing tape to an inner wall of the space of the upper cover part before accommodating the battery cell assembly in the space.

The accommodating of the battery cell assembly in the space may include accommodating the battery cell assembly so that the upper surface of the battery cell assembly faces downward, and the manufacturing method of the battery module may further include displaying a lower plate to cover a lower surface of the battery cell assembly opposite to the upper surface of the battery cell assembly so as to be coupled with the upper cover part.

The manufacturing method of the battery module may further include providing a heat dissipation pad between the lower plate and the lower surface of the battery cell assembly.

Integrally combining the upper cover part and the two bus bar frame parts may include welding the upper cover part and the two bus bar frame parts.

A battery pack according to an embodiment of the present invention includes at least one of the battery module as above-described, and a pack case packing the at least one battery module.

A device according to an embodiment of the present invention includes at least one of the battery pack as above-described.

Advantageous Effects

According to the embodiments, by integrally forming the bus bar frame and the upper cover, the battery module, and the manufacturing method thereof, which prevent component damage and assembly separation caused from a hinge structure and have a simplified manufacturing process and improved precision by the assembly in the method of inserting the electrode lead into the slit formed in the bus bar frame, may be provided.

DETAILED DESCRIPTION OF THE EMBODIMENTS

Figure 1:
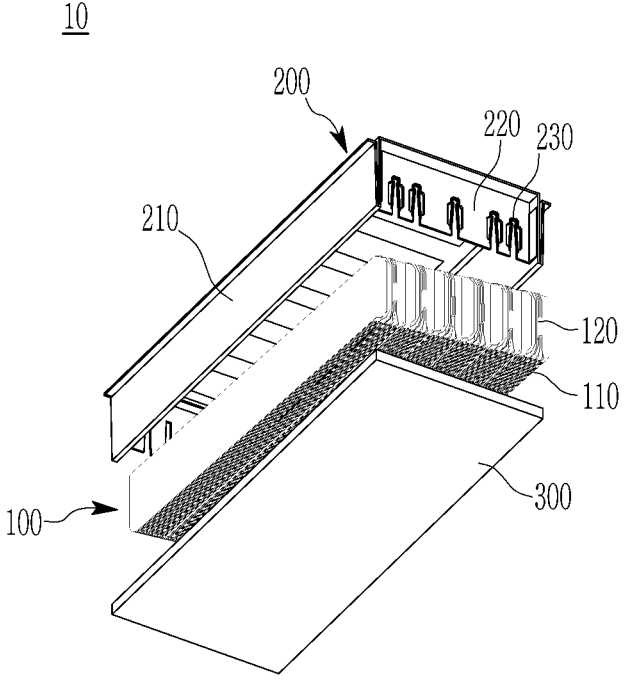
FIG. 1 is an exploded view of a battery module according to an embodiment of the present invention.

The present invention will be described more fully hereinafter with reference to the accompanying drawings, in which embodiments of the present invention are shown. As those skilled in the art would realize, the described embodiments may be modified in various different ways, without departing from the spirit or scope of the present invention.

The drawings and description are to be regarded as illustrative in nature and not restrictive. Like reference numerals designate like elements throughout the specification.

In addition, the size and thickness of each component shown in the drawings are arbitrarily shown for ease of understanding and description, but the present invention is not limited thereto. In the drawings, the thickness of layers, films, panels, regions, etc., are exaggerated for clarity. In addition, in the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. In addition, the word "on" means positioning on or below the object portion, but does not necessarily mean positioning on the upper side of the object portion based on a direction of gravity.

In addition, unless explicitly described to the contrary, the word "comprise", and variations such as "comprises" or "comprising", will be understood to imply the inclusion of stated elements but not the exclusion of any other elements.

Now, a battery module according to an embodiment of the present invention is described with reference to FIG. 1 to FIG. 3.

Figure 2:
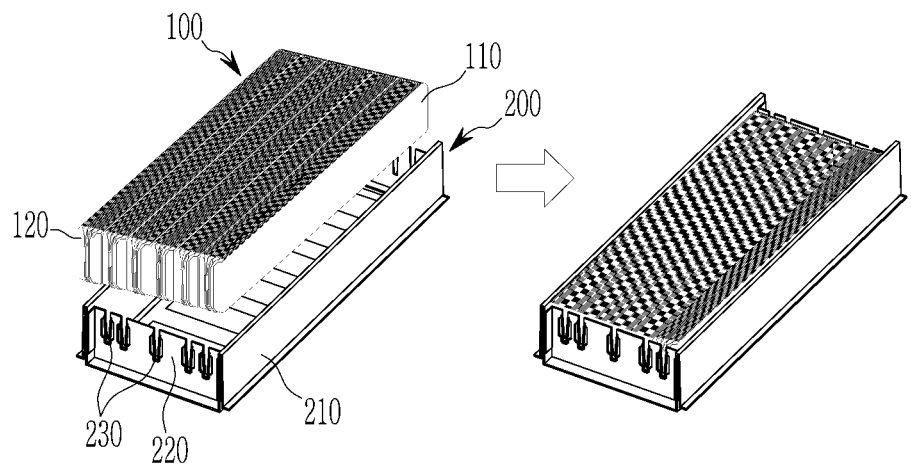
FIG. 2 is a view showing a combination state of a module cover and a battery cell assembly in a battery module according to an embodiment of the present invention.
Figure 3:
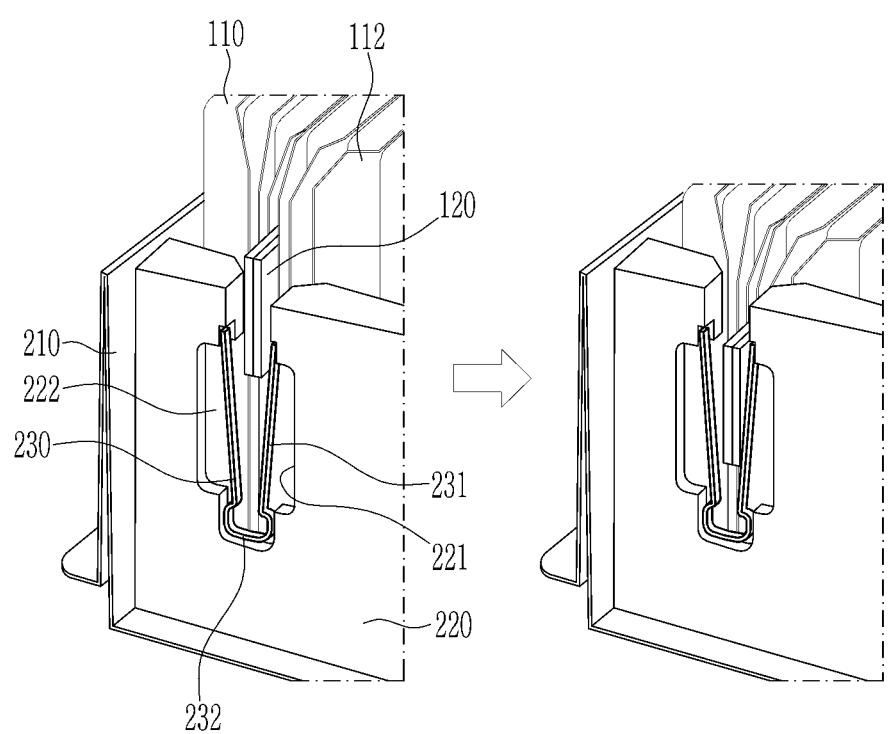
FIG. 3 is a view showing a combination state of an electrode lead and a bus bar in a battery module according to an embodiment of the present invention.

FIG. 1 is an exploded view of a battery module according to an embodiment of the present invention, FIG. 2 is a view showing a combination state of a module cover and a battery cell assembly in a battery module according to an embodiment of the present invention, and FIG. 3 is a view showing a combination state of an electrode lead and a bus bar in a battery module according to an embodiment of the present invention.

Referring to FIG. 1, a battery module 10 according to the present embodiment includes a battery cell assembly 100 including a plurality of battery cells 110 stacked in parallel and adjacent to each other and a plurality of electrode leads 120 protruded from each of a plurality of battery cells 110, and a module cover 200 receiving the battery cell assembly 100, the module cover 200 includes an upper cover part 210 exposing a plurality of electrode leads 120 while covering the upper surface and the side surface of the battery cell assembly 100 and a bus bar frame part 220 coupled with the upper cover part 210 to be integrally formed with the upper cover part 210 at a position corresponding to a plurality of electrode leads 120 exposed by the upper cover part 210, and the bus bar frame part 220 includes a plurality of bus bars 230 electrically connected to a plurality of electrode leads 120.

The battery cell assembly 100 is an assembly of the rechargeable batteries including a plurality of battery cells 110. The battery cell assembly 100 may include a plurality of battery cells 110, and each battery cell 110 may include an electrode assembly, a battery case, and the electrode lead 120 protruded from the electrode assembly. The electrode assembly may consist of a positive plate, a negative plate, and a separator. The battery case is for packaging the electrode assembly, and may be made of a laminate sheet including a resin layer and a metal layer. The battery case may include a case body and a cell terrace 112, referring to FIG. 3. The electrode lead 120 may be electrically connected to the electrode assembly. In addition, the battery cell 110 may be a pouch-type battery cell having a plate shape, but is not limited thereto.

The electrode leads 120 may be formed of a flat plate to be protruded toward at least one side of the battery cell 110. These electrode leads 120 may be stacked and protruded in one direction, through which the electrode leads 120 may be connected in series or in parallel. The electrode leads 120 may function as a battery terminal, and may be formed of a metal material such as copper or aluminum. In addition, the electrode leads 120 may be formed in various thicknesses and in various widths. The thickness or width of the electrode lead 120 may be manufactured differently according to the specifications of the rechargeable battery and the battery module.

A plurality of battery cells 110 is vertically stacked so that the electrode leads 120 are aligned in one direction, thereby forming the battery cell assembly 100. The battery cell assembly 100 is accommodated to the module cover 200 including the upper cover part 210 exposing the plurality of electrode leads 120 while covering the upper surface and the side surface of the battery cell assembly 100 and the bus bar frame part 220 coupled with the upper cover part 210 to be integrally formed with the upper cover part 210 at the position corresponding to a plurality of electrode leads 120 exposed by the upper cover part 210. At this time, the electrode leads 120 stacked and protruded in one direction are electrically connected to the bus bar 230 included in the bus bar frame part 220.

That is, the bus bar frame part 220 includes a plurality of slits 221 into which a plurality of electrode leads 120 may be inserted, and a bus bar 230 electrically connected to the electrode leads 120 is positioned inside each slit 221. The slit 221 is opened toward the lower surface of the battery cell assembly 100 exposed by the upper cover part 210. The bus bar 230, as shown in FIG. 3, has a shape of tongs or a clip formed long along the length direction of the slit 221. Referring to FIG. 3, the bus bar 230 may be formed of a clamping part 231 formed to insert the electrode lead 120 and a fixing part 232 connecting and fixing the clamping part 231.

The clamping part 231 may be formed of a shape extending diagonally from the fixing part 232 toward the opening of the slit 221, and when the electrode lead 120 is inserted, the electrode lead 120 may be in contact with the inner surface of the clamped part 231 between the extended parts of the clamping part 231. The fixing part 232 serves to connect and fix the clamping part 231 on the lower side of the clamping part 231. The fixing part 232 is connected to the lower end part of the clamping part 231, and according to an embodiment of the present invention, the fixing part 232 is formed to have a curvature to the lower side of the clamping part 231, thereby the electrode lead 120 makes it easy to insert the clamping part 231 and simultaneously prevents a deformation or movement of the clamping part 231 elastically so that the clamping part 231 is fixed.

The bus bar 230 as described above may be mounted on the slit 221 formed on the upper cover part 210 that is integrally formed with the bus bar frame part 220. The slit 221 is opened in the direction opposite to the upper surface of the upper cover part 210, and as shown in FIG. 1, is opened in the direction facing the lower plate 300. Therefore, as shown in FIG. 2, when accommodating the battery cell assembly 100 in the module cover 200, the electrode lead 120 is inserted into the slit 221 so that the electrode lead 120 is in contact with the bus bar 230 in the state that the upper cover part 210 is disposed to face downward.

At this time, the clamping part 231 and the fixing part 232 of the bus bar 230 are formed in the shape of a bent plate-shaped clip having a minimum width that is sufficient to be in contact with the flat surface of the electrode lead 120, thereby reducing unnecessary volume of a conventional bus bar structure and mounting the more lightweight bus bar device on the battery module.

The electrode lead 120 is electrically connected to bus bar 230, and accordingly the contact between the electrode lead 120 and the bus bar 230 is required. To this end, the electrode lead 120 is stacked in the horizontal direction in the shape of the flat plate and formed to be protruded in a plurality of battery cells 110, respectively, and the electrode leads 120 protruded in this way are inserted into the clamping part 231 of the bus bar 230 and then are contacted and fixed by the clamping part 231 on the left and right, thereby achieving an electrical connection with the bus bar 230.

Now, the configuration of the module cover 200 is described in more detail with reference to FIG. 4.

Figure 4:
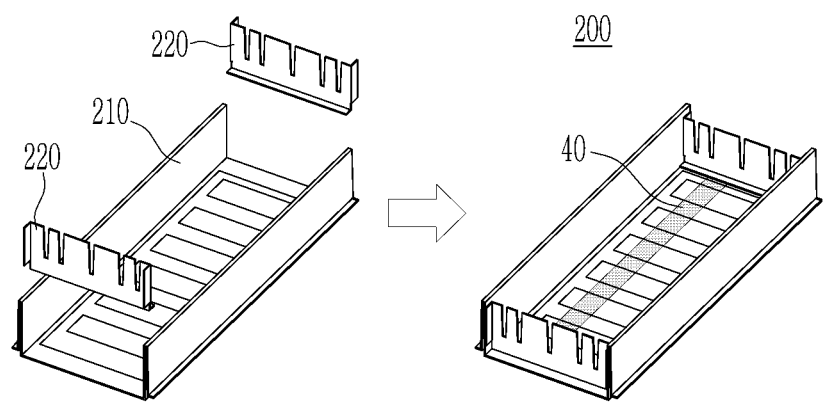
FIG. 4 is a view showing a module cover according to an embodiment of the present invention.

FIG. 4 is a view showing a module cover according to an embodiment of the present invention.

The module cover 200 is constituted in such a way that the upper cover part 210 covering the upper part and both side surfaces of the battery cell assembly 100 and two bus bar frame parts 220 covering two sides that are not covered by the upper cover part 210, that is, the exposed surface of the electrode lead 120, are integrally formed.

The upper cover part 210, as shown in FIG. 4, is constituted by the upper surface covering the upper part of the battery cell assembly 100 and two side surfaces vertically extending from the length direction edge of the upper surface to both sides. The upper cover part 210 may include a reinforcing member of a skeletal shape in the inside to increase rigidity. The upper cover part 210, which is composed of the upper surface and the side surfaces formed on both sides, is formed so that the cross-section has an angular U shape and extends long in the direction in which the side surface is extended.

Two bus bar frame parts 220 are respectively coupled to both end parts of the upper cover part 210 formed long in this way. By the bus bar frame part 220 that is integrally combined to the upper cover part 210, the module cover 200 in the box form in which one surface that may accommodate the battery cell assembly 100 is opened is completed. At this time, the bus bar frame part 220 may be coupled to the upper cover part 210 by welding along the side in contact with the upper cover part 210. Alternatively, it is possible to assemble by inserting both sides of the bus bar frame part 220 into a groove after forming the groove inside the upper cover part 210, and the integrally formed method is not particularly limited.

In addition, the battery module 10 includes a flexible printed circuit board (FPCB) 40 configured to sense the battery cell 110 by extending and mounting in the length direction of the battery cell assembly 100 at the upper part of the battery cell assembly 100. As shown in FIG. 4, in the present embodiment, the flexible printed circuit board 40 may be disposed on the inside of the upper surface of the upper cover part 210 and then mounted on the battery cell assembly 100 that is accommodated later to be electrically connected to the battery cells.

In this way, by the configuration in which the bus bar frame part 220 and the upper cover part 210 are integrally formed, a structure in which an ICB (Internal Circuit Board) cover positioned on the upper part of the battery cell assembly and the bus bar frame are combined by a hinge structure may be excluded. In other words, in the combination of the conventional hinge structure, the separation of the ICB cover and the bus bar frame is generated in the hinge part, or if the module is moved in a temporary assembly state, it is difficult to respond to automation due to the flow generated in the hinge part, or there is a problem such as damage to the flexible printed circuit board passing through hinge part. Also, the bus bar of the bus bar frame is configured to be coupled to the electrode lead of the battery cell assembly by the rotation of the bus bar frame, and in this process, there is a difficulty in the alignment of the bus bar frame and the electrode lead.

However, in the present embodiment, since the bus bar frame part 220 and the upper cover part 210 are integrally formed as described above, the hinge structure that causes many problems as described above is completely excluded, thereby solving the problems caused by the hinge structure. In addition, since the coupling method of the electrode lead 120 and the bus bar 230 is performed simply by inserting the electrode leads 120 into the slit 221 formed on the bus bar frame part 220, the manufacturing process may also be simplified and the electrode lead 120 and the bus bar 230 may be precisely combined.

Meanwhile, as shown in FIG. 1, the battery module 10 may be completed by coupling the lower plate 300 to the opened part of the module cover 200 in which the battery cell assembly 100 is accommodated.

Next, a manufacturing method of the battery module according to an embodiment of the present invention is described.

First, a battery cell assembly 100 including a plurality of battery cells 110 adjacent to each other and stacked in parallel and a plurality of electrode leads 120 protruded from each of the plurality of battery cells 110 is provided.

In addition, the upper cover part 210, which is composed of an upper surface and two side surfaces vertically extending to both sides from the length direction edge of the upper surface, and includes a space in which the battery cell assembly 100 is disposed, is provided.

And, the module cover 200 is completed by integrally combining the bus bar frame part 220 to each of both end parts in the length direction of the upper cover part 210.

Then, the battery cell assembly 100 is accommodated in the module cover 200. At this time, it is assembled so that the electrode lead 120 of the battery cell assembly 100 is inserted into the slit 221 of the bus bar frame part 220. In other words, by inserting the electrode lead 120 into the clamping part 231 of the bus bar 230 positioned inside the slit 221 and making the clamping part 231 and the electrode lead 120 be in contact, the bus bar 230 and the electrode lead 120 may be electrically connected to each other.

Subsequently, the battery module 10 may be completed by coupling the lower plate 300 to the opened part of the module cover 200 in which the battery cell assembly 100 is accommodated. The coupling of the lower plate 300 may be achieved by being welded with the module cover 200 along the edge of the lower plate 300, but it is not particularly limited. At this time, since the part where lower plate 300 is positioned becomes the bottom surface of the battery module 10, the battery module 10 in its original use state may be obtained by turning over the battery module 10 again after the assembly is completed.

According to the manufacturing method of the battery module, particularly, the combination of the electrode lead 120 and the bus bar 230 is achieved by inserting the electrode lead 120 into the slit 221 formed in the bus bar frame part 220, not by the rotation of bus bar frame, and therefore, the process may be performed simply and precisely.

Next, the battery module according to another embodiment of the present invention is described with reference to FIG. 5 and FIG. 6.

Figure 5:
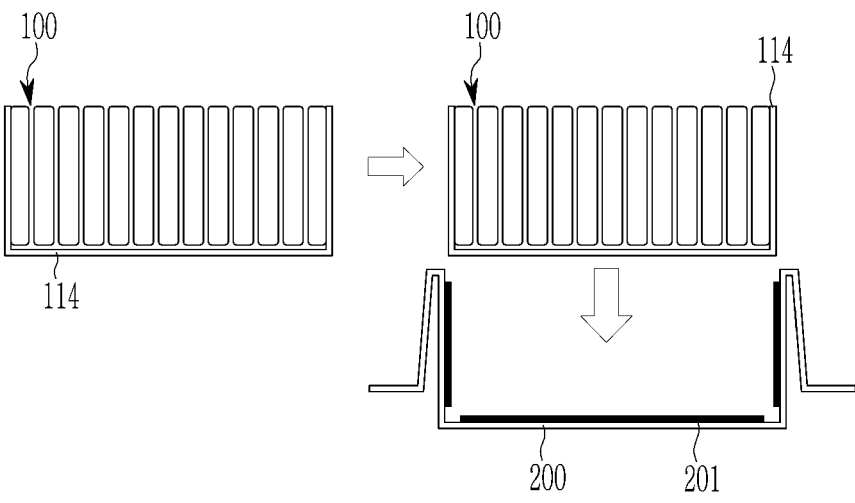
FIG. 5 is a cross-sectional view of a module cover and a battery cell assembly according to another embodiment of the present invention.
Figure 6:
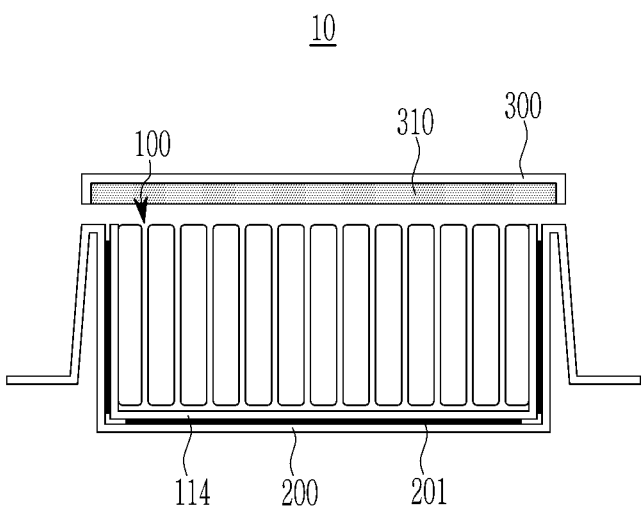
FIG. 6 shows a cross-section of a battery module according to another embodiment of the present invention.

FIG. 5 is a cross-section view of a module cover and a battery cell assembly according to another embodiment of the present invention, and FIG. 6 is a cross-section of a battery module according to another embodiment of the present invention.

As shown in FIG. 5, the battery cell assembly 100 according to the present embodiment includes an insulating pad 114 covering at least a portion of the outer surface thereof. That is, by accommodating the battery cell assembly 100 in the module cover 200 while covering the battery cell assembly 100 with the insulating pad 114, it is possible to prevent the battery cell assembly 100 from being damaged by colliding with the edge of the module cover 200. In addition, since the battery cell assembly 100 is once again protected by the insulating pad 114, it is desirable not only to obtain a thermal insulating effect so that it is affected by sudden external temperature changes, but also to obtain an insulating effect from other conductive parts. As the insulating pad 114, a pad made of polyurethane or silicone foam may be used, but it is not particularly limited.

Also, as shown in FIG. 5, in the battery module 10 according to the present embodiment, the module cover 200 may further include a cell housing tape 201 attached to the inner side thereof. That is, by attaching the cell housing tape 201 inside the module cover 200 before accommodating the battery cell assembly 100 in the module cover 200, it is preferable because the inner surface of the module cover 200 and the battery cell assembly 100, which are in contact with the battery cell assembly 100, may be protected. As the cell housing tape 201, a tape made of materials such as acryl tape and urethane foam tape may be used, but is not particularly limited.

Also, as shown in FIG. 6, the battery module 10 according to the present embodiment may further include a heat dissipation pad 310 positioned between the lower plate 300 and the battery cell assembly 100. By providing the heat dissipation pad 310, heat generated from the battery cell assembly 100 may be effectively discharged. As the heat dissipation pad 310, a pad made of a thermally conductive resin may be used, and for example, may include at least one of an acryl-based resin, an epoxy resin, a urethane-based resin, an olefin resin, an EVA (ethylene vinyl acetate) resin, or a silicon-based resin. As described above, according to the present embodiment, since the heat dissipation pad 310 is provided between the lower plate 300 and the battery cell assembly 100, the process of injecting and curing a resin composition into the module frame may be omitted, thereby simplifying the process and providing excellent heat dissipation performance.

Meanwhile, one or more of the battery modules according to an exemplary embodiment of the present invention may be packaged in a pack case to form a battery pack.

The aforementioned battery module and battery pack including the same may be applied to various devices. The device may be applied to a vehicle such as an electric bicycle, an electric vehicle, or a hybrid vehicle, but the present invention is not limited thereto, and may be applied to various devices that can use a battery module, and this is also included in the scope of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10: battery module
100: battery cell assembly
120: electrode lead
200: module cover
210: the upper cover part
220: bus bar frame part
230: bus bar
221: slit
300: lower plate

What is claimed is:

1. A battery module comprising:
a battery cell assembly including a plurality of battery cells adjacent to each other and stacked in parallel, and a plurality of electrode leads protruding from respective ones of the plurality of battery cells along a protrusion direction; and
a module cover accommodating the battery cell assembly,
wherein the module cover includes an upper cover part exposing the plurality of electrode leads while covering an upper surface and a side surface of the battery cell assembly, and a bus bar frame part coupled with the upper cover part and integrally formed with the upper cover part at a position corresponding to the plurality of electrode leads exposed by the upper cover part, wherein the upper cover part and the bus bar frame part are integrally combined, such that the upper cover part and the bus bar frame part are rigidly fixed and non-rotatable with respect to one another, so as to form the module cover,
wherein the bus bar frame part includes a plurality of bus bars electrically connected to respective ones of the plurality of electrode leads, and
wherein each one of the plurality of bus bars includes a clamping part to which an electrode lead of the plurality of electrode leads is inserted, a fixing part connecting and fixing the clamping part, and an opening defined opposite the fixing part along a first direction, the first direction being orthogonal to the protrusion direction.

2. The battery module of claim 1, wherein the bus bar frame part includes a plurality of slits in which respective ones of the plurality of electrode leads are inserted, and the plurality of bus bars are disposed inside respective ones of the plurality of slits.

3. The battery module of claim 2, wherein the plurality of slits are opened toward a lower surface of the battery cell assembly exposed by the upper cover part.

4. The battery module of claim 1, wherein the battery cell assembly further includes an insulating pad surrounded around the battery cell assembly and positioned between the battery cell assembly and the upper cover part.

5. The battery module of claim 1, wherein the upper cover part further includes a cell housing tape disposed between the battery cell assembly and the upper cover part.

6. The battery module of claim 1, wherein the module cover further includes a lower plate covering a lower surface of the battery cell assembly exposed by the upper cover part.

7. The battery module of claim 6, further comprising a heat dissipation pad disposed between the lower plate and the battery cell assembly.

8. The battery module of claim 1, wherein the bus bar frame part is welded to the upper cover part.

9. A manufacturing method of the battery module of claim 1, comprising:
providing the battery cell assembly including the plurality of battery cells adjacent to each other and stacked in parallel, and the plurality of electrode leads protruding from respective ones of the plurality of battery cells along the protrusion direction;
preparing the upper cover part including a space accommodating the battery cell assembly by including the upper surface of the battery cell assembly and two side surfaces of the battery cell assembly perpendicular to the upper surface;
disposing the upper cover part and two bus bar frame parts to cover end parts of the space and integrally combining the upper cover part and the two bus bar frame parts to manufacture the module cover, wherein the upper cover part and the two bus bar frame parts are integrally combined, such that the upper cover part and the two bus bar frame parts are rigidly fixed with respect to one another, so as to form the module cover; and
accommodating the battery cell assembly in the space.

10. The manufacturing method of the battery module of claim 9, wherein the two bus bar frame parts include a plurality of slits each including an opening in which respective ones of the plurality of electrode leads are inserted, and wherein the accommodating of the battery cell assembly in the space includes inserting the plurality of electrode leads in respective openings formed in the plurality of slits.

11. The manufacturing method of the battery module of claim 9, wherein the two bus bar frame parts include a plurality of bus bars disposed in respective ones of a plurality of slits and electrically connected to respective ones of the plurality of electrode leads.

12. The manufacturing method of the battery module of claim 9, further comprising wrapping at least a portion of an outer surface of the battery cell assembly with an insulating pad before accommodating the battery cell assembly in the space.

13. The manufacturing method of the battery module of claim 9, further comprising attaching a cell housing tape to an inner wall of the space of the upper cover part before accommodating the battery cell assembly in the space.

14. The manufacturing method of the battery module of claim 9, wherein the accommodating of the battery cell assembly in the space includes accommodating the battery cell assembly so that the upper surface of the battery cell assembly faces downward, and further comprising displaying a lower plate to cover a lower surface of the battery cell assembly opposite to the upper surface of the battery cell assembly so as to be coupled with the upper cover part.

15. The manufacturing method of the battery module of claim 14, further comprising providing a heat dissipation pad between the lower plate and the lower surface of the battery cell assembly.

16. The manufacturing method of the battery module of claim 9, wherein integrally combining the upper cover part and the two bus bar frame parts includes welding the upper cover part and the two bus bar frame parts.

17. A battery pack comprising:

at least one of the battery module of claim 1; and a pack case packing the at least one battery module.

18. A device comprising at least one of the battery pack of claim 17.

19. A battery module comprising:

a battery cell assembly including a plurality of battery cells adjacent to each other and stacked in parallel, and a plurality of electrode leads protruding from respective ones of the plurality of battery cells along a protrusion direction; and a module cover accommodating the battery cell assembly, wherein the module cover includes an upper cover part exposing the plurality of electrode leads while covering an upper surface and a side surface of the battery cell assembly, and a bus bar frame part coupled with the upper cover part and integrally formed with the upper cover part at a position corresponding to the plurality of electrode leads exposed by the upper cover part, and wherein the bus bar frame part includes a plurality of bus bars electrically connected to respective ones of the plurality of electrode leads, wherein the bus bar frame part includes a plurality of slits in which respective ones of the plurality of electrode leads are inserted, wherein the plurality of bus bars are disposed within respective ones of the plurality of slits, and wherein each one of the plurality of bus bars includes a clamping part to which an electrode lead of the plurality of electrode leads is inserted, a fixing part connecting and fixing the clamping part, and an opening defined opposite the fixing part along a first direction, the first direction being orthogonal to the protrusion direction.

* * * * *